(No Model.)

R. G. PETERS.

DISCHARGE MECHANISM FOR VACUUM PANS.

No. 366,505. Patented July 12, 1887.

WITNESSES:
Fred G. Dieterich
John C. Lemon

INVENTOR:
R. G. Peters
BY Munn & Co.
ATTORNEYS.

United States Patent Office.

RICHARD G. PETERS, OF MANISTEE, MICHIGAN.

DISCHARGE MECHANISM FOR VACUUM-PANS.

SPECIFICATION forming part of Letters Patent No. 366,505, dated July 12, 1887.

Application filed March 26, 1887. Serial No. 232,608. (No model.)

*To all whom it may concern:*

Be it known that I, RICHARD G. PETERS, of Manistee, in the county of Manistee and State of Michigan, have invented a new and useful Improvement in Discharge Mechanisms for Vacuum-Pans, of which the following is a specification.

My invention is an improved discharge mechanism for salt and other vacuum-pans, and seeks to provide a simple and convenient means of positively discharging the precipitate.

The invention consists in certain constructions and combinations of parts, as will be described, and pointed out in the claims.

Figure 1:
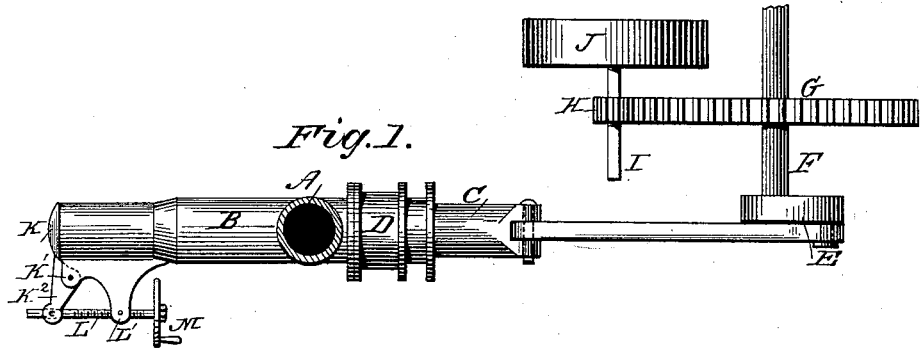
Figure 2:
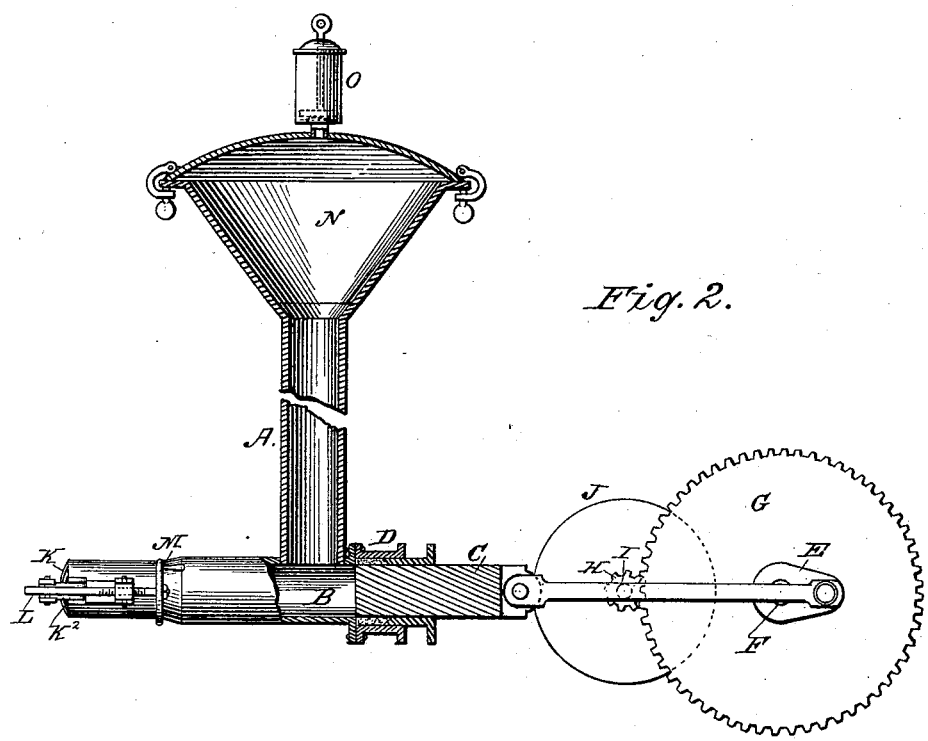

In the drawings, Figure 1 is a plan view, and Fig. 2 a side view, of my improvement.

The leg A may be connected with and depend from a vacuum-pan of any ordinary or desired construction, and the vacuum may be maintained by any suitable means to properly sustain the solution in the pan and leg. At its lower end the leg opens into a discharge-chamber, B, which in the construction shown is reduced in diameter at one end and has at such end a valve, K. This valve is shown as a gate-valve, being pivoted at K', and having an extension or arm, K², to which is connected a screw, L, turning in a threaded bearing, L', and having a hand-wheel, M, by turning which the valve may be forcibly and tightly closed. At the opposite end of chamber B, I form a stuffing-box, D, which may be of any suitable construction, and which serves to secure a tight joint at such end of the chamber.

The carrier is in the form of a plunger, C, movable within the chamber B and connected with crank E, by which it is given a longitudinal reciprocating movement. The crank E is supported on shaft F, and is driven through the medium of shaft I and gears G, H, and J; but, manifestly, the form of drive mechanism for such plunger might be varied, or such plunger might be operated by hand. The latter, however, would not probably be desirable in practice, and is only mentioned to show that the device might be operated in such manner. This plunger moves through the stuffing-box D in rear of the outlet of the leg A, and then moves forward across said outlet, carrying or pushing the precipitate forward out of the reduced end of the chamber B, where it will fall into a conveyer for removal to storage-bins.

The valve K, which may be substituted by any other form of valve, is useful for the purpose of closing the outlet of the chamber B at the beginning of the process, and also in securing a vacuum in case the vacuum be lost from any cause.

By means of my improvement it will be seen that the precipitate, which may be salt, (or other material which will precipitate in a vacuum, and which it is desired to derive from a solution,) is forcibly discharged, and such discharge is effected automatically by means of the carrier C when such carrier is driven by power, as shown.

The means for maintaining a vacuum may, like the pan N shown, be of any suitable form or character. In that shown the pan has a tight-sealing cover, and a typical air-pump, O, is shown as the means for producing the vacuum. I do not mean to say that the said air-pump will be used for such purpose; but it is only shown for the purpose of aiding in the illustration of my invention, which lies particularly in the positive discharge mechanism, and in such mechanism in connection with a leg-pipe and any suitable form of vacuum-producing mechanism or device, and in such combination of parts it is manifest that any vacuum-producing device would be the equivalent of that shown.

In operation the valve K may be closed and the solution placed in the tank, leg-pipe, and chamber B. The pump is now operated to produce the vacuum above the solution, in order that the latter may be sustained by the atmospheric pressure. When the vacuum is secured, the valve K may be opened and the plunger be reciprocated within the chamber B, pushing the precipitate, which falls from the leg-pipe forward, and discharging it from time to time as the operation proceeds.

I claim—

1. An apparatus, substantially as described, comprising a leg, a chamber arranged below the discharge end thereof, a pump or its equivalent for maintaining a vacuum, and a carrier movable within said chamber, whereby to positively discharge the precipitate, substantially as and for the purposes set forth.

2. The combination of the leg-pipe, the chamber B, the plunger, and the valve K, substantially as set forth.

3. The improved apparatus, substantially as described, consisting of the leg-pipe, the chamber below said leg, a pump or its equivalent for maintaining a vacuum, a valve, K, means for tightly closing said valve, and the plunger and operating mechanism therefor, substantially as set forth.

4. The combination, with the leg-pipe and the discharge-chamber arranged below the same, of a pump or its equivalent for maintaining a vacuum, and a carrier movable within the discharge-chamber, whereby to positively discharge the precipitate, substantially as set forth.

RICHARD G. PETERS.

Witnesses:
F. H. SMITH,
J. A. PROCTOR.